US007381387B2

(12) United States Patent
Lissianski et al.

(10) Patent No.: US 7,381,387 B2
(45) Date of Patent: Jun. 3, 2008

(54) MERCURY REDUCTION SYSTEM AND METHOD IN COMBUSTION FLUE GAS USING COAL BLENDING (75) Inventors: Vitali Victor Lissianski, San Juan Capistrano, CA (US); Vladimir M. Zamansky, Oceanside, CA (US); Peter Martin Maly, Lake Forest, CA (US); William Randall Seeker, San Clemente, CA (US)

(73) Assignee: General Electric Company, Schenectady, NY (US)

( * ) Notice: Subject to any disclaimer, the term of this patent is extended or adjusted under 35 U.S.C. 154(b) by 846 days.

(21) Appl. No.: 10/640,262

(22) Filed: Aug. 14, 2003

(65) Prior Publication Data
US 2005/0036926 A1    Feb. 17, 2005

(51) Int. Cl.
C01G 9/00    (2006.01)
(52) U.S. Cl. .................... 423/99; 423/240 R
(58) Field of Classification Search .......... 423/99, 423/240 R, 240 S, 210, 594.18; 588/320, 588/400, 404, 412
See application file for complete search history.

(56) References Cited
U.S. PATENT DOCUMENTS

| | | | |
|---|---|---|---|
| 4,196,173 A | 4/1980 | deJong et al. | |
| 4,233,274 A | 11/1980 | Allgulin | |
| 4,273,747 A | 6/1981 | Rasmussen | |
| 4,729,882 A * | 3/1988 | Ide et al. | 423/210 |
| 4,814,152 A | 3/1989 | Yan | |
| 4,843,102 A | 6/1989 | Horton | |
| 5,141,724 A | 8/1992 | Audeh et al. | |
| 5,409,522 A | 4/1995 | Durham et al. | |
| 5,413,477 A | 5/1995 | Moreland | |
| 5,572,938 A | 11/1996 | Leger | |
| 5,695,726 A | 12/1997 | Lerner | |
| 5,787,823 A | 8/1998 | Knowles | |
| 6,027,551 A | 2/2000 | Hwang et al. | |
| 6,136,281 A * | 10/2000 | Meischen et al. | 423/210 |
| 6,156,281 A * | 12/2000 | Akers et al. | 423/107 |
| 6,206,685 B1 | 3/2001 | Zamansky et al. | |
| 6,280,695 B1 | 8/2001 | Lissianski et al. | |
| 6,284,208 B1 * | 9/2001 | Thomassen | 423/210 |
| 6,451,094 B1 | 9/2002 | Chang et al. | |
| 6,471,506 B1 | 10/2002 | Zamansky et al. | |
| 6,521,021 B1 | 2/2003 | Pennline et al. | |
| 6,558,454 B1 | 5/2003 | Chang et al. | |
| 6,595,147 B2 | 7/2003 | Teller et al. | |
| 6,604,474 B2 | 8/2003 | Zamansky et al. | |
| 6,719,828 B1 | 4/2004 | Lovell et al. | |
| 2001/0041157 A1 | 11/2001 | Spokoyny | |
| 2002/0029690 A1 | 3/2002 | Ridgeway et al. | |
| 2002/0095866 A1 | 7/2002 | Hassett | |
| 2002/0102189 A1 | 8/2002 | Madden et al. | |
| 2002/0166484 A1 | 11/2002 | Zamansky et al. | |
| 2002/0170431 A1 | 11/2002 | Chang et al. | |
| 2003/0005634 A1 | 1/2003 | Calderon et al. | |
| 2003/0009932 A1 | 1/2003 | Kobayashi et al. | |
| 2003/0079606 A1 | 5/2003 | Katz | |
| 2003/0091490 A1 | 5/2003 | Nolan et al. | |
| 2003/0091948 A1 | 5/2003 | Bool, III et al. | |
| 2003/0099912 A1 | 5/2003 | Kobayashi et al. | |
| 2003/0099913 A1 | 5/2003 | Kobayashi et al. | |
| 2003/0104328 A1 | 6/2003 | Kobayashi et al. | |
| 2003/0104937 A1 | 6/2003 | Sinha | |
| 2003/0108470 A1 | 6/2003 | Spencer et al. | |
| 2003/0108833 A1 | 6/2003 | Kobayashi et al. | |
| 2003/0110994 A1 | 6/2003 | Lissianski et al. | |
| 2003/0143128 A1 | 7/2003 | Lanier et al. | |
| 2003/0147793 A1 | 8/2003 | Breen et al. | |
| 2003/0154858 A1 | 8/2003 | Kleut et al. | |
| 2003/0185718 A1 | 10/2003 | Sellakumar | |
| 2004/0011057 A1 | 1/2004 | Huber | |

OTHER PUBLICATIONS

"Kinetic Models For Predicting the Behavior Of Mercury In Coal-Fired Power Plants", C. Senior, et al., ACERC Annual Conference, Feb. 19-20, 2003, pp. 1-22.

"Evaluating The Effects of Low-NOx Retrofits on Carbon In Ash Levels", K.A. Davis, et al. Presented at the Mega Symposium: EPRI-DOE-EPA Combined Utility Air Pollutant Control Symposium, Atlanta, GA, Aug. 1999, pp. 1-15.

"Behavior of Mercury In Air Pollution Control Devices on Coal-Fired Utility Boilers" Constance L. Senoir, Prepared For Power Production in the 21st Century: Impacts of Fuel Quality and Operations, Engineering Foundation Conference, Snowbird, UT, Oct. 28-Nov. 2, 2001, pp. 1-17.

"Loss On Ignition In Coal Combustion Simulations", Stefan P. Domino et al., pp. 1-49 (1999) (publicly available on Internet).

Reaction Engineering International brochure "Furnace Performance", Reaction Engineering International, printed from REI website on Aug. 22, 2003, pp. 1-2.

"Comparison of Photoacoustic Methods To Loss-On-Ignition and Foam Index Tests In Fly Ash Evaluations", Robert Novack, et al., pp. 1-2 (1997), no month.

"Combustion Optimization Using MPV Systems", Mark Khesin, et al., Pittsburgh Coal Conference, Sep. 2000, pp. 1-4.

(Continued)

Primary Examiner—Edward M Johnson
(74) Attorney, Agent, or Firm—Nixon & Vanderhye P.C.

(57) ABSTRACT

A method to reduce mercury in gas emissions from the combustion of low rank coal in a combustion system including: combusting coal having a low chlorine content in the combustion system, wherein elemental mercury ($Hg^0$) is released in the flue gas produced by the combustion of the low rank coal; releasing chlorine into the flue gas by combusting a coal having a high chlorine in the combustion system; reacting the elemental mercury and released chlorine in the flue gas to oxidize the mercury; adsorbing at least a portion of the oxidized mercury generated by the combustion of the coal with an adsorbent in the flue gas, and collecting the adsorbent with the oxidized mercury in a combustion waste treatment system.

40 Claims, 3 Drawing Sheets

OTHER PUBLICATIONS

John H. Pavlish et al., "Status Review Of Mercury Control Options For Coal-Fired Power Plants", Fuel Processing Technology 82 (2003), pp. 89-165, no month.

Thomas D. Brown et al., "Mercury Measurement And Its Control: What We Know, Have Learned, and Need To Further Investigate", Journal of the Air & Waste Management Association, pp. 628-640, vol. 49, Jun. 1999.

Blair A. Folsom et al, "Combustion Modification—An Economic Alternative for Boiler $NO_x$ Control", GE Power Systems, GER-4192, pp. 1-8, Apr. 2001.

R. Sehgal et al., "Intelligent Optimization of Coal Burning to Meet Demanding Power Loads, Emission Requirements, and Cost Objectives", GE Power Systems, GER-4198, pp. 1-14, Oct. 2000.

The Washington Post, "Limiting Mercury Pollution Is Focus of Hot Debate", pp. A3, Mar. 15, 2004.

"Reburn Systems", GE Power Systems, Air Quality Systems & Services, printed Dec. 2003, pp. 1-3.

"FlamemastEER™ Low $NO_x$ Burners", printed Dec. 2003, p. 1.

"$NO_x$ Control for Gas Turbines", GE Power Systems, Dec. 17, 2003, pp. 1-2.

"$NO_x$ Control for Boilers", GE Power Systems, Dec. 17, 2003, pp. 1-2.

"Coalogic™", GE Power Systems, Dec. 17, 2003, pp. 1-2.

"Coal Balancing & Blending", GE Power Systems, Dec. 17, 2003, pp. 1-2.

"$NO_x$ Reduction", Hamon, Dec. 8, 2003, pp. 1-2.

"Selective Catalytic Reduction (SCR)", Hamon, Dec. 8, 2003, pp. 1-2.

"Selective Non-Catalytic Reduction (SCR)", Hamon, Dec. 8, 2003, pp. 1-3.

"SCR SNCR Hybrid System", Hamon, Dec. 8, 2003, pp. 1-2.

"Evaluation of the Effect of SCR NOx Control Technology on Mercury Speciation", Freely, III et al., Mar. 2003, pp. 1-11.

* cited by examiner

MERCURY REDUCTION SYSTEM AND METHOD IN COMBUSTION FLUE GAS USING COAL BLENDING

BACKGROUND OF THE INVENTION

This invention relates to the combustion of coal and in particular to the reduction of mercury (Hg) in flue gases generated during coal combustion.

Mercury is a constituent part of coal mineral matter. The emission of mercury from coal-fired power plants is one of major sources of environmental mercury. The U.S. Environmental Protection Agency (EPA) has identified mercury emissions from power plants as a significant hazard to public health. The EPA is considering regulations that would require utility companies operating coal-fired power plants to minimize mercury emissions. Accordingly, there is a need for effective and inexpensive technologies to control mercury emissions from power plants.

Mercury is generally discharged in waste products from coal combustion. Mercury volatizes during coal combustion as elemental mercury ($Hg^0$). A portion of this mercury is oxidized as flue gas cools. It is believed that most oxidized mercury ($Hg^{+2}$) in flue gas is present as mercury chloride $HgCl_2$. Although elemental and oxidized mercury both can be adsorbed on fly ash, oxidized mercury is adsorbed more easily. Since oxidized mercury is water soluble, it can be removed by wet scrubbers that are used to control sulfur dioxide ($SO_2$) emissions. Ash borne mercury may be removed by a particulate collection system in the power plant. However, mercury that remains as elemental mercury tends to remain in the flue gas and is particularly difficult to remove by conventional combustion emission control devices.

Eastern bituminous coals have a high amount of chlorine, e.g., more than 800 parts per million (ppm). The chlorine released during the combustion of bituminous coals assists in oxidizing to $HgCl_2$ the elemental mercury released during combustion of the coals. The $HgCl_2$ is readily captured by fly ash, sorbents, wet scrubbers and other types of emission control technologies.

There is a particular need to control mercury emissions from power plants burning Powder River Basin (PRB) and lignite coals. PRB coals are mined from the Powder River Basin in Wyoming and Montana of the United States. These coals represent a significant portion of the available coal for power utilities. PRB and lignite coals are desirable, in part, because they have a low sulfur content. Flue gases from these coals tend to have desirably low sulfur dioxide ($SO_2$) emissions. The mercury in PRB and lignite coals (collectively "low rank coals") tends to remain as elemental mercury in the flue gas, and does not readily oxidize or convert to other forms of mercury. Low rank coals tend to have a low chlorine (Cl) content, e.g., typically less than 100 parts-per-million (ppm). In the combustion of low rank coals, mercury oxidation in the flue gas is suppressed due to the low chlorine (Cl) content and the presence of other constituents in low rank coals.

Controlling the emission of mercury in combustion flue gas is complicated because mercury may take different forms. These forms of mercury change during the combustion process and as the flue gas cools and flows through combustion gas control systems. The effectiveness of a control technology for treating mercury emissions depends on the form or speciation of the mercury present as the flue gas passes through the controls. If the form or speciation of the mercury is not accurately known or changes during emission control treatment, then selecting an effective mercury emission control technology becomes increasingly difficult.

SUMMARY OF THE INVENTION

In one embodiment, the invention is a method to reduce mercury in gas emissions from the combustion of low rank coal in a combustion system, said method including: combusting coal having a low chlorine content in the combustion system, wherein elemental mercury ($Hg^0$) is released in the flue gas produced by the combustion of the low rank coal; releasing chlorine into the flue gas by combusting a coal having a high chlorine in the combustion system; reacting the elemental mercury and released chlorine in the flue gas to oxidize the mercury; adsorbing at least a portion of the oxidized mercury generated by the combustion of the coal with a solid adsorbent in the flue gas, and collecting the adsorbent with the oxidized mercury in a combustion waste treatment system. Alternatively, oxidized mercury can be removed by wet scrubber.

In another embodiment, the invention is a method to reduce mercury in gas emissions from the combustion of low rank coal in a combustion system, said method comprising: combusting a Powder River Basin coal (PRB) having a low chlorine content in the combustion system, wherein elemental mercury ($Hg^0$) is released in the flue gas produced by the combustion; releasing chlorine into the flue gas by combusting a bituminous coal having a high chlorine in the combustion system; reacting the elemental mercury and released chlorine in the flue gas to oxidize the mercury and generate mercury chloride ($HgCl_2$); adsorbing at least a portion of the the $HgCl_2$ generated by the combustion of the coal with an adsorbent, and collecting the adsorbent with the $HgCl_2$ in a combustion waste treatment system. Alternatively, oxidized mercury can be removed by wet scrubber.

In a further embodiment, the invention is a system to treat mercury in flue gas emissions from a coal fired boiler comprising: a coal injector adapted to receive a low chlorine coal and a high chlorine coal; a combustor have a combustion chamber receiving coal from the coal injector and having a flue gas output; a combustion treatment waste system coupled to the flue gas output and a discharge for captured particulate waste, and wherein said combustor burns the low chlorine coal and the high chlorine coal such that elemental mercury ($Hg^0$) released in the flue gas produced by the combustion of the low chlorine coal is oxidized by chlorine released during combustion of the high chlorine coal, and the oxidized mercury is adsorbed by particulates in the flue gas. Alternatively, oxidized mercury can be removed by wet scrubber.

In another embodiment, the invention is a method to reduce mercury in gas emissions from the combustion of low rank coal in a combustion system, said method comprising: combusting coal having a low chlorine content in the combustion system, wherein elemental mercury ($Hg^0$) is released in the flue gas produced by the combustion of the low rank coal; releasing chlorine into the flue gas by combusting a coal having a high chlorine in the combustion system; reacting the elemental mercury and released chlorine in the flue gas to oxidize the mercury, and removing at least a portion of the oxidized mercury generated by the combustion of the coal with a water scrubbing device.

DETAILED DESCRIPTION OF THE INVENTION

Figure 1:
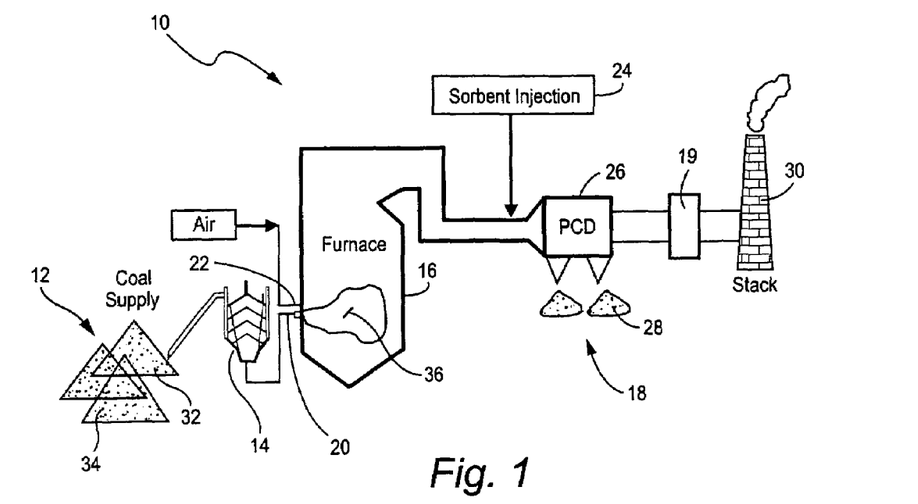
FIG. 1 is a schematic diagram of a coal fired power plant having coal blending and sorbent injection.

FIG. 1 shows a coal-fired power plant 10 comprising a supply of various types of coal 12, a coal mixing bin 14, a coal-fired boiler 16, and a combustion waste treatment system 18. The boiler includes a coal fuel injection system 20 and air injectors 22. The combustion waste treatment system includes a sorbent injection system 24, a particulate control device (PCD) 26 with an ash discharge 28, wet scrubber 19, and a stack 30 for flue gas discharge. The PCD captures fly ash and sorbent in the flue gas. The wet scrubber removes $SO_2$ from flue gas.

The coal supply 12 and mixing bin includes low rank coals 32 and another type of coal 34 having a relatively high chlorine (Cl) content, such as a bituminous coal having an average chlorine content of between 100 to 2000 parts per million (ppm). In contrast Low rank coal 32 typically has a low chlorine content, such as below 100 ppm. Low rank coals are blended with a high chlorine content coal, e.g., a chlorine content above 100 ppm.

The low rank and high chlorine content coals are blended in the mixing bin 14. The ratio of low rank coal to bituminous coal is selected such that the amount of chlorine in the coal injected into the combustion zone 36 of the boiler 16 produces sufficient chlorine in the flue gases to assist in the treatment of mercury emissions. For example, the blended coal may be 30% high chlorine content coal and 70% low rank coal. The blended coal is fired in the combustion zone 36 of the boiler 16. Alternatively, low 32 and high 34 chlorine coals can be fired separately into combustion zone 36.

The chlorine in a high chlorine content coal assists in oxidation of the mercury vaporized during combustion of the low-rank coal. Oxidized mercury is relatively easily adsorbed by solid particles in the flue gas, such as sorbent and fly ash. Bituminous coal tends to generate relatively high LOI in fly ash, which can be used to adsorb mercury in the flue gas. Oxidized mercury is also relatively easily removed from flue gas by gas desulfurization system (FGD) such as wet scrubber 19.

Increasing the amount of chlorine in the flue gases improves the efficiency of mercury reduction techniques that rely on the oxidation of mercury. The presence of chlorine converts the mercury in the flue gas to mercury chloride ($HgCl_2$), which may be captured using various conventional emission treatment systems. Such treatment systems 24 include injecting activated carbon (AC) upstream of a PCD. In addition, selective catalytic reduction (SCR) may be used to enhance mercury oxidation and wet flue gas desulfurization (FGD) may be used to enhance capture of $HgCl_2$. Other techniques for removal of oxidized mercury in flue gases may be employed.

Activated carbon or other sorbent material (collectively "sorbent") may be injected 24 in the flue gases from the boiler. The sorbent is injected downstream of the boiler and upstream of the waste treatment system 18.

Figure 2:
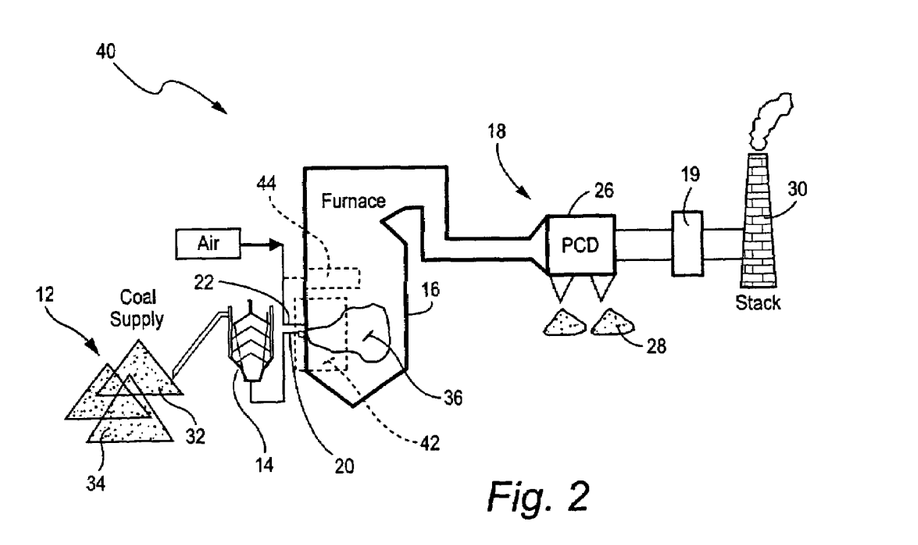
FIG. 2 is a schematic diagram of coal fired power plant having coal blending and a modified combustion system.

FIG. 2 depicts a power plant 40 similar to the plant 10 shown in FIG. 1. The same reference numbers have been used to label the components of the power plant 40 shown in FIG. 2 that are the same as the components of the power plant 10 shown in FIG. 1. The power plant 40 has a modified combustion section 42 of the boiler 16. The combustion section 42 is modified so that amount of carbon in fly ash generated during coal combustion is greater than would be expected in a conventional, efficient combustor of a coal-fired boiler.

Coal combustion in coal-fired boilers is usually not complete and generates fly ash with some carbon content. Combustion of bituminous coal tends to generate more carbon in fly ash than does the combustion of low rank coals. Adding bituminous coals to low rank coals tends to increase the amount of carbon in fly ash generated during combustion which increases reactivity of fly ash towards mercury.

Moreover, active high carbon fly ash is often generated during the conventional Low Oxides of Nitrogen ($NO_x$) Burn (LNB) process, in overfire air (OFA) injection zones 44, and in connection with other conventional low $NO_x$ combustion technologies. The combustion zone 42 of the boiler is configured such that active fly ash is formed in fuel-rich zones of the gas stream in the boiler. For example, an OFA injection zone 44 may be configured so that it does not completely burnout the carbon in the fly ash as the flue gases pass through the OFA injection zone. Accordingly, the amount of carbon in fly ash flowing through the boiler and downstream of the combustion zone is greater than would otherwise be expected in an efficient coal-fired boiler.

As the high carbon fly ash flows down stream from the boiler, the flue gas and ash cool. In a temperature range of 140° F. to 400° F., the high carbon fly ash is suitable for a baghouse or electrostatic precipitator (ESP). As the fly ash cools, the active carbon in the fly ash adsorbs mercury from flue gas. The ash adsorbs the mercury upstream and inside of the PCD 26. The ash with adsorbed mercury is collected in the PCD 26 and discharged as ash waste discharge 28. The power plant 40 generating reactive fly may be used with or without the sorbent injector 24 shown in the plant 10 shown in FIG. 2.

Figure 3:
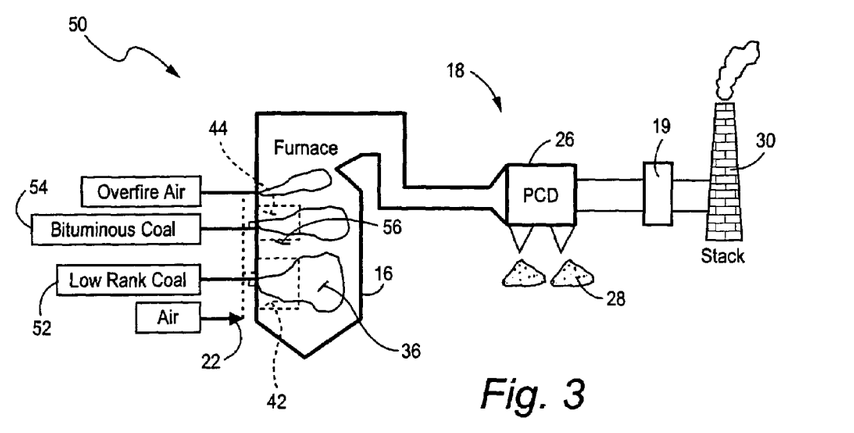
FIG. 3 is a schematic diagram of coal fired power plant having a bituminous coal injection separately of low rank coal injection.

FIG. 3 depicts a power plant 50 similar to the plant 10 shown in FIG. 1. The same reference numbers have been used to label the components of the power plant 50 shown in FIG. 3 that are the same as the components of the power plant 10 shown in FIG. 1. The power plant 50 includes a low rank coal injection system 52 that feeds low rank coal into the combustion section 42 of the boiler. The low rank coal 32 has a low chlorine content and is fired in the main combustion zone 42 of the boiler without first being blended with a high chlorine content bituminous coal.

Bituminous coal 54 or other high-chlorine coal is burned in a reburn zone 56 of the boiler to form high carbon fly ash and to provide the chlorine needed to oxidize the mercury released during coal combustion. The chlorine released by burning bituminous coal in the reburning zone oxidizes the mercury released by burning the low rank and bituminous coals.

Moreover, the combustion section 42 and the reburning zone 54 may be configured to generate high carbon fly ash from the coal combustion. As high carbon fly ash cools, the active carbon in the fly ash adsorbs mercury from the flue gas. The PCD 26 collects the ash with carbon and adsorbed Hg.

The benefits and effectiveness of burning low rank coal with high chlorine coal, and of generating high carbon fly ash are evident from the following test. Tests were performed in a 1.0 MMBTU/hr Boiler Simulator Facility (BSF) 60 to determine the effect of coal composition on Hg removal. The BSF facility is shown schematically in FIG. 4. The BSF provides sub-scale simulation of the flue gas temperatures and compositions found in a full-scale boiler.

Figure 4:
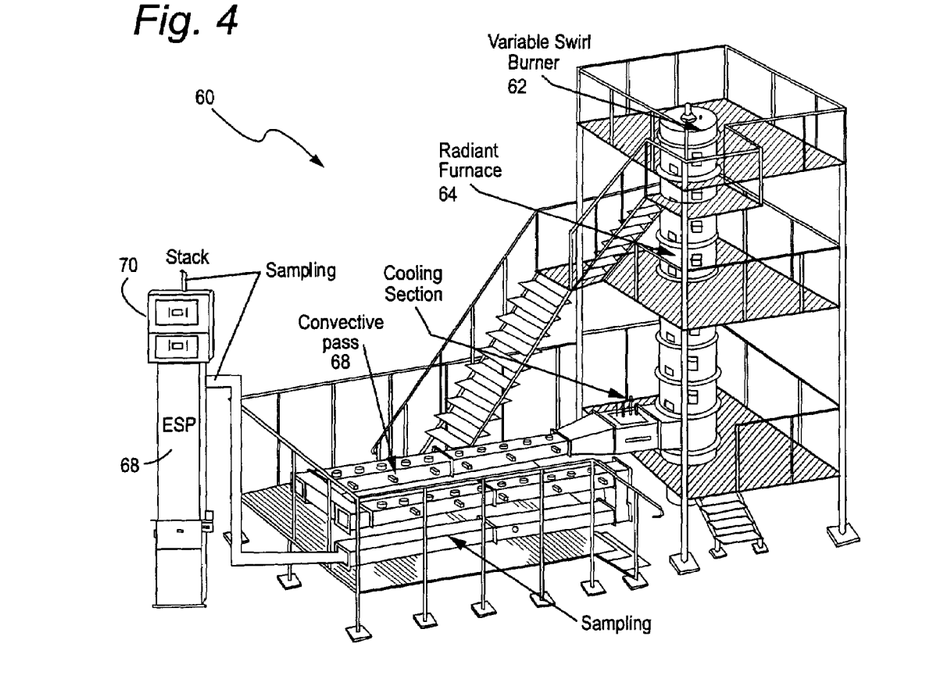
FIG. 4 illustrates a boiler simulation facility.

As shown in FIG. 4, the BSF 60 includes a burner 62, a vertically down-fired radiant furnace 64, a cooling section 66, a horizontal convective pass 68 extending from the furnace, an ESP 68 and a stack with flue gas sampling instruments 70 in communication with the convective pass. The burner 62 is a variable swirl diffusion burner with an axial fuel injector, and is used to simulate the approximate temperature and gas composition of a commercial burner in a full-scale, coal-fired boiler. Primary air is injected axially into the combustion zone of the boiler. Secondary air is injected radially through swirl vanes (not shown) to provide controlled fuel/air mixing in the combustion zone. The swirl number can be controlled by adjusting the angle of the swirl vanes. Numerous access ports located along the axis of the facility allow access for supplementary equipment such as reburn injectors, additive injectors, overfire air injectors, and sampling probes.

The radiant furnace 64 has eight modular refractory lined sections with an inside diameter of 22 inches and a total height of 20 feet. The convective pass 68 is also refractory lined, and contains air cooled tube bundles to simulate the superheater and reheater sections of a utility boiler. Heat extraction in radiant furnace and convective pass can be controlled such that the residence time-temperature profile matches that of a typical full-scale boiler. A suction pyrometer (not shown) measures furnace gas temperatures.

The ESP 70 for the BSF is a single-field unit consisting of 12 tubes with axial corona electrodes. Mercury concentration was measured at ESP outlet using an online Hg analyzer. The analyzer is capable of measuring both elemental ($Hg^0$) and total mercury in flue gas. Tests were conducted with Powder River Basin (PRB) coal, bituminous, and blends of PRB and bituminous coal to determine efficiency of mercury removal by fly ash across the ESP. The average temperature across the ESP was 350° F.

Figure 5:
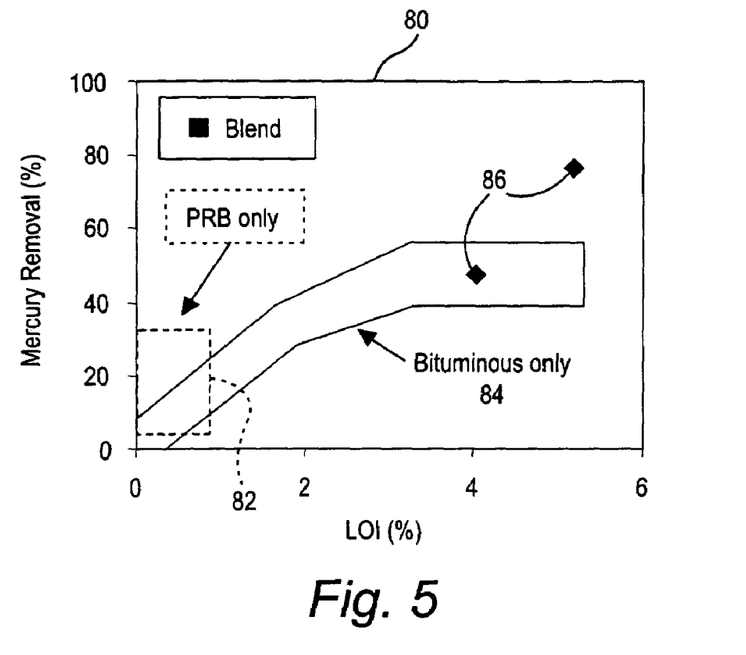
FIG. 5 is a chart of the effects of mercury removal with respect to loss on ignition (LOI) of the fly ash produced by combustion of PRB, Eastern Bituminous, and coal blend.

FIG. 5 is a chart 80 that presents results of the BSF tests regarding mercury emissions from the combustion of a low-rank coal (s), an Eastern bituminous only coal (s), and a blend of low-rank and Eastern bituminous coal. High carbon fly ash was formed using air staging during each test. Stoichiometric ratio ($SR_1$) in the main combustion zone was in the range of 0.5-1.0, and final stoichiometric ratio ($SR_2$) was 1.16 which corresponded to about 3% excess oxygen in flue gas. Overfire air (OFA) was injected at flue gas temperatures in the range of 1800-2500° F. Variation in OFA injection temperature was achieved by changing location of the OFA injection port.

Test results with PRB coal demonstrated that $SR_1$ and OFA injection temperature had a small effect on carbon in ash content (as indicated by levels of the LOI—loss on ignition) and Hg removal in PRB coals. Variation of these test parameters resulted in LOI in the range of 0.2% to 0.8%. Mercury removal by fly ash in PRB coals was in the range of 6% to 35%, as is shown in FIG. 5 in the area 82 indicated by dashed lines. These tests 82 results are consistent with the mercury remaining in elemental form ($Hg^0$) in the flue gas and is not substantially oxidized.

Test results 84 with bituminous coal demonstrated that changes in combustion conditions had significant effect on the LOI level of the fly ash. Mercury adsorption increased as LOI increased, and the level of Hg adsorption reached about 60% at an LOI of 5%. These tests 84 are consistent with the mercury in the flue gas being oxidized and converted to $HgCl_2$ by the chlorine released as the bituminous coal burns.

Test results 86 were conducted with a PRB/bituminous coal blend (70/30) having composition of 70% PRB and 30% Eastern bituminous coals on a weight basis. These tests 86 demonstrated that a change in combustion conditions had a significant effect on LOI and Hg adsorption by fly ash. The mercury adsorption in the 70/30 coal blend was about the same as in bituminous coal only, even though the bituminous coal comprised only 30% of the coal blend.

Figure 6:
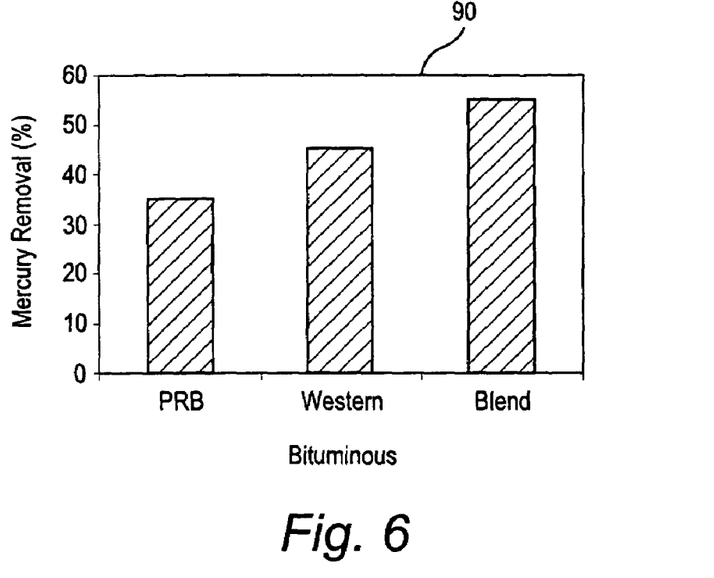
FIG. 6 is a chart of the effects of mercury removal with respect to loss on ignition (LOI) of the fly ash produced by combustion of PRB, Western Bituminous, and coal blend.

FIG. 6 is a chart 90 that presents results of the BSF tests regarding mercury emissions from the combustion of a PRB coal, an Western Bituminous only coal, and a 70/30 blend of PRB and Western bituminous coals. High carbon fly ash was formed using air staging during each test. OFA air was injected at 1800° F. $SR_1$ and $SR_2$ were 1.05 and 1.16, respectively. FIG. 6 demonstrate that mercury removal efficiency for the coal blend was 55% and was higher than that for PRB and bituminous coal only. The pilot-scale experiments results show that efficiency of mercury removal by fly ash for low-rank coal can be improved by blending them with bituminous coal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to reduce mercury in gas emissions from the combustion of low rank coal in a combustion system, said method comprising:
   a. combusting the low rank coal having a low chlorine content in the combustion system, wherein elemental mercury ($Hg^0$) is released in the flue gas produced by the combustion of the low rank coal;
   b. releasing chlorine into the flue gas by combusting a second coal type with the low rank coal in the combustion system, wherein the second coal type has a high chlorine content;
   c. reacting the elemental mercury and released chlorine in the flue gas to oxidize the mercury;
   d. adsorbing at least a portion of the oxidized mercury generated by the combustion of the first and second coal with an adsorbent in the flue gas, and
   e. collecting the adsorbent with the oxidized mercury in a combustion waste treatment system.

2. A method as in claim 1 wherein the coal having the low chlorine content is a low-rank coal and the coal having the high chlorine content is an Eastern U.S. Bituminous coal.

3. A method as in claim 1 wherein the coal having the low chlorine content is a low-rank coal and the coal having the high chlorine content is a Western U.S. Bituminous coal.

4. A method as in claim 1 wherein the coal having the low chlorine content is a Powder River Basin coal.

5. A method as in claim 1 wherein the coal having the low chlorine content has less than 100 parts-per-million (ppm) of chlorine and the coal having the high chlorine content has greater than 100 ppm of chlorine.

6. A method as in claim 1 wherein the coal having the low chlorine content is blended with the coal having the high chlorine prior to combustion.

7. A method as in claim 1 wherein the coal having the low chlorine content is blended with the coal having the high chlorine prior to step (a) and step (b).

8. A method as in claim 1 wherein the coal having the high chlorine content is combusted in the flue gas down stream in the flue gas generated by the combustion of the coal having the low chlorine content.

9. A method as in claim 1 wherein the combustion waste treatment system includes a particle control device and the adsorption of oxidized mercury includes injecting sorbent as the adsorbent into the flue gas to adsorb the mercury.

10. A method as in claim 1 wherein the combustion waste treatment system includes a particle control device and the oxidized mercury is adsorbed on fly ash and captured by particle control device.

11. A method as in claim 1 wherein the adsorbent is fly ash generated by the combustion and the loss on ignition level of the fly ash is at least 0.5 percent.

12. A method as in claim 1 wherein the adsorbent is fly ash generated by the combustion and said method further comprises generating excessive carbon in fly ash as the adsorbent and the loss on ignition level of the fly ash is at least 0.5 percent.

13. A method as in claim 1 wherein the adsorbent is water from a wet scrubber in the combustion waste treatment system.

14. A method as in claim 1 further comprising applying air staging by overfire air injection to generate excessive carbon fly ash.

15. A method as in claim 14 wherein a stoichiometric ration (SR) of the combustion of coal in a main combustion zone of the combustion system is in a range of 0.5 to 1.1.

16. A method as in claim 14 wherein a stoichiometric ration (SR) of the combustion of coal in a main combustion zone of the combustion system is in a range of 0.8 to 1.05.

17. A method as in claim 1 further comprising coal reburning in the combustion system to generate carbon in fly ash generated during combustion.

18. A method as in claim 17 wherein an amount of reburning fuel is in a range of 10 to 30 percent of a total heat input of fuel used for the combustion of coal.

19. A method as in claim 17 wherein an amount of reburning fuel is in a range of 15 to 25 percent of a total heat input of fuel used for the combustion of coal.

20. A method to reduce mercury in gas emissions from the combustion of coal in a combustion system, said method comprising:
   a. combusting a Powder River Basin coal (PRB) having a low chlorine content in the combustion system, wherein elemental mercury ($Hg^0$) is released in the flue gas produced by the combustion;
   b. releasing chlorine into the flue gas by combusting a bituminous coal with the PRB coal in the combustion system, wherein the bituminous coal has a high chlorine content;
   c. reacting the elemental mercury and released chlorine in the flue gas to oxidize the mercury and generate mercury chloride ($HgCl_2$);
   d. adsorbing at least a portion of the oxidized mercury generated by the combustion of the coal with an adsorbent, and
   e. collecting the adsorbed mercury in a combustion waste treatment system.

21. A method as in claim 20 wherein the coal having the high chlorine content is an Eastern U.S. Bituminous coal.

22. A method as in claim 20 wherein the coal having the high chlorine content is a Western U.S. Bituminous coal.

23. A method as in claim 20 wherein the Powder River Basin coal is blended with the coal having the high chlorine prior to combustion.

24. A method as in claim 20 wherein the coal having the high chlorine content is combusted in the flue gas down stream in the flue gas generated by the combustion of the Powder River Basin coal.

25. A method as in claim 20 wherein the combustion waste treatment system includes a particle control device and the adsorption of oxidize mercury includes injecting sorbent as the adsorbent into the flue gas.

26. A method as in claim 20 wherein the combustion waste treatment system includes a particle control device and the oxidized mercury is adsorbed on fly ash and captured by particle control device.

27. A method as in claim 20 wherein the adsorbent is fly ash generated by the combustion and a loss on ignition of the fly ash is at least 0.5 percent.

28. A method as in claim 20 wherein the adsorbent is fly ash generated by the combustion and said method further comprises generating excessive carbon in fly ash as the adsorbent such that a loss on ignition of the fly ash is at least 0.5 percent.

29. A method as in claim 20 wherein the adsorbent is water from a wet scrubber in the waste treatment system.

30. A method as in claim 20 wherein an amount of the coal with the high chlorine is in the range of 10-50 percent by mass.

31. A method to reduce mercury in gas emissions from the combustion of low rank coal in a combustion system, said method comprising:
   a. combusting the low rank coal having a low chlorine content in the combustion system, wherein elemental mercury ($Hg^0$) is released in the flue gas produced by the combustion of the low rank coal;
   b. releasing chlorine into the flue gas by combusting a second coal type with the low rank coal in the combustion system, wherein the second coal type has a high chlorine content;
   c. reacting the elemental mercury and released chlorine in the flue gas to oxidize the mercury, and
   d. removing at least a portion of the oxidized mercury generated by the combustion of the first and second coal with a water scrubbing device.

32. A method as in claim 31 wherein the water scrubbing device is a wet gas desulfurization system.

33. A method as in claim 31 wherein the coal having the low chlorine content is a low-rank coal and the coal having the high chlorine content is an Eastern U.S. Bituminous coal.

34. A method as in claim 31 wherein the coal having the low chlorine content is a low-rank coal and the coal having the high chlorine content is a Western U.S. Bituminous coal.

35. A method as in claim 31 wherein the coal having the low chlorine content is a Powder River Basin coal.

36. A method as in claim 31 wherein the coal having the low chlorine content has less than 100 parts-per-million (ppm) of chlorine and the coal having the high chlorine content has greater than 100 ppm of chlorine.

37. A method as in claim 31 wherein the coal having the low chlorine content is blended with the coal having the high chlorine prior to combustion.

38. method as in claim 31 wherein the coal having the low chlorine content is blended with the coal having the high chlorine prior to step (a) and step (b).

39. A method as in claim 31 wherein the coal having the high chlorine content is combusted in the flue gas down stream in the flue gas generated by the combustion of the coal having the low chlorine content.

40. A method as in claim 31 wherein an amount of the coal with the high chlorine is in the range of 10 percent to 50 percent by weight of the coal with the low chlorine.

* * * * *

UNITED STATES PATENT AND TRADEMARK OFFICE
CERTIFICATE OF CORRECTION

PATENT NO. : 7,381,387 B2
APPLICATION NO. : 10/640262
DATED : June 3, 2008
INVENTOR(S) : Vitali Lissianski et al.

Page 1 of 1

It is certified that error appears in the above-identified patent and that said Letters Patent is hereby corrected as shown below:

In Column 6 delete claim 1 in its entirety and insert:

1. A method to reduce mercury in gas emissions from the combustion of low rank coal in a combustion system, said method comprising:

a. combusting a first coal having a low chlorine content in the combustion system, wherein elemental mercury ($Hg^0$) is released in the flue gas produced by the combustion of the low rank coal;

b. releasing chlorine into the flue gas by combusting a second coal having a high chlorine in the combustion system;

c. reacting the elemental mercury and released chlorine in the flue gas to oxidize the mercury;

d. adsorbing at least a portion of the oxidized mercury generated by the combustion of the first and second coal with an adsorbent in the flue gas, and e. collecting the adsorbent with the oxidized mercury in a combustion waste treatment system.

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,381,387 B2
APPLICATION NO. : 10/640262
DATED : June 3, 2008
INVENTOR(S) : Vitali Lissianski et al.

It is certified that error appears in the above-identified patent and that said Letters Patent is hereby corrected as shown below:

In Column 6, lines 38-55 delete claim 1 in its entirety and insert:

1. A method to reduce mercury in gas emissions from the combustion of low rank coal in a combustion system, said method comprising:

a. combusting a first coal having a low chlorine content in the combustion system, wherein elemental mercury ($Hg^0$) is released in the flue gas produced by the combustion of the low rank coal;

b. releasing chlorine into the flue gas by combusting a second coal having a high chlorine in the combustion system;

c. reacting the elemental mercury and released chlorine in the flue gas to oxidize the mercury;

d. adsorbing at least a portion of the oxidized mercury generated by the combustion of the first and second coal with an adsorbent in the flue gas, and e. collecting the adsorbent with the oxidized mercury in a combustion waste treatment system.

This certificate supersedes the Certificate of Correction issued September 16, 2008.

Signed and Sealed this

Seventh Day of October, 2008

JON W. DUDAS
*Director of the United States Patent and Trademark Office*